US006899913B1

(12) United States Patent
Buwalda et al.

(10) Patent No.: US 6,899,913 B1
(45) Date of Patent: May 31, 2005

(54) FOODSTUFF CONTAINING DISCRETE STARCH PARTICLES

(75) Inventors: Pieter Lykle Buwalda, Groningen (NL); Ido Pieter Bleeker, Ten Boer (NL); Jakob Roelf Wolltjes, Veendam (NL); Cindy Semeijn, Groningen (NL)

(73) Assignee: Cooperative Verkoop-en Productievereniging van Aardappelmeel en Derivaten Avebe B.A., Ja Veendam (NL)

( * ) Notice: Subject to any disclaimer, the term of this patent is extended or adjusted under 35 U.S.C. 154(b) by 0 days.

(21) Appl. No.: 09/936,344

(22) PCT Filed: Mar. 16, 2000

(86) PCT No.: PCT/NL00/00174

§ 371 (c)(1), (2), (4) Date: Feb. 19, 2002

(87) PCT Pub. No.: WO00/54607

PCT Pub. Date: Sep. 21, 2000

(30) Foreign Application Priority Data

Mar. 17, 1999 (EP) .............................................. 99200829

(51) Int. Cl.[7] ........................ A23L 1/0522; C08B 31/00
(52) U.S. Cl. ........................ 426/578; 426/589; 426/590
(58) Field of Search ................................ 426/578, 589, 426/590, 549, 661, 519

(56) References Cited

U.S. PATENT DOCUMENTS

| | | | |
|---|---|---|---|
| 4,368,212 A | | 1/1983 | Heckman |
| 5,370,894 A | | 12/1994 | Singer |
| 5,720,822 A | * | 2/1998 | Jeffcoat et al. ................ 127/65 |
| 5,904,940 A | * | 5/1999 | Senkeleski et al. ............ 426/52 |
| 5,904,941 A | * | 5/1999 | Xu et al. ....................... 426/52 |
| 6,488,980 B1 | * | 12/2002 | Jeffcoat et al. ............. 426/661 |
| 6,541,060 B2 | * | 4/2003 | Jeffcoat et al. ............. 426/578 |
| 2003/0087006 A1 | * | 5/2003 | Buwalda et al. .............. 426/94 |

FOREIGN PATENT DOCUMENTS

| | | |
|---|---|---|
| EP | 0 796 868 A | 9/1997 |
| EP | 000796868 A2 * | 9/1997 |
| JP | 11332468 | 7/1999 |
| WO | 89/12403 | 12/1989 |
| WO | 98/31240 | 7/1998 |

* cited by examiner

Primary Examiner—N. Bhat
(74) Attorney, Agent, or Firm—Hoffmann & Baron, LLP

(57) ABSTRACT

The invention relates to starch used in the food industry, more specifically to starch used in processed foodstuff that, at least in one processing step, is subject to heat and, or shear treatment. The invention provides use of modified starches and methods to use these in foodstuffs (soups, (dairy) desserts, sauces, creams, dressings, fillings and such), that, when used in preparing foodstuff that is subject to heat and/or shear treatment, provide said foodstuff with the so desired smooth, short textures and shiny appearance, even after prolonged treatment where use of other starches would render the product slimy, coarse or dull.

12 Claims, 8 Drawing Sheets

Amylopectin PS with high crosslink level after 1 min. shear

FIG. 1 Amylopectin PS with low crosslink level before shear
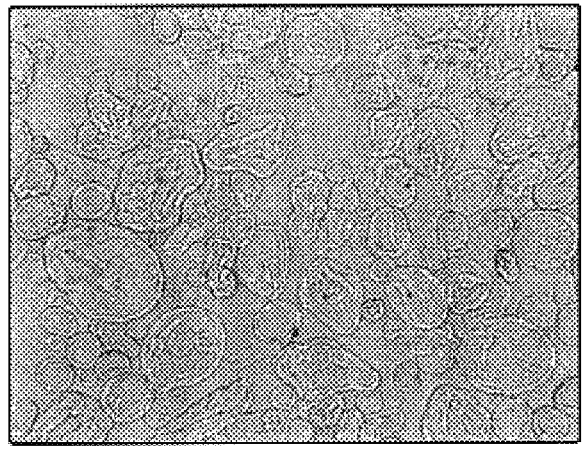
FIG. 2 Amylopectin PS with low crosslink level after 1 min. shear
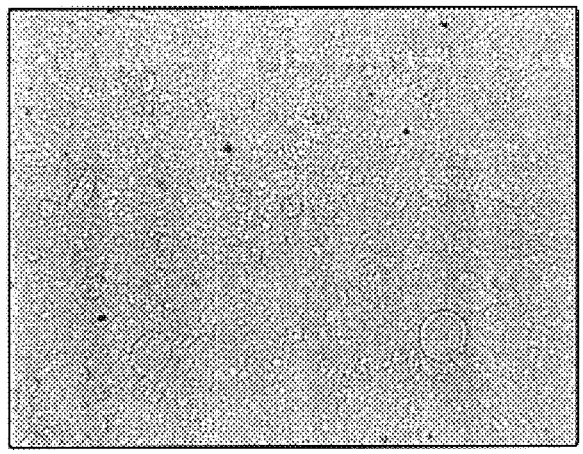
FIG. 3 Amylopectin PS with low crosslink level after 2 min. shear
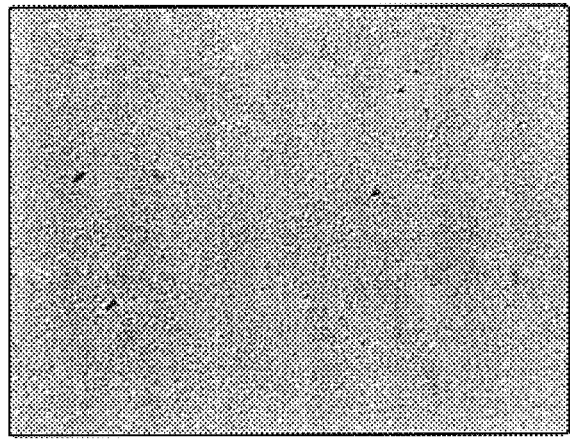

FIG. 4 Amylopectin PS with high crosslink level before shear
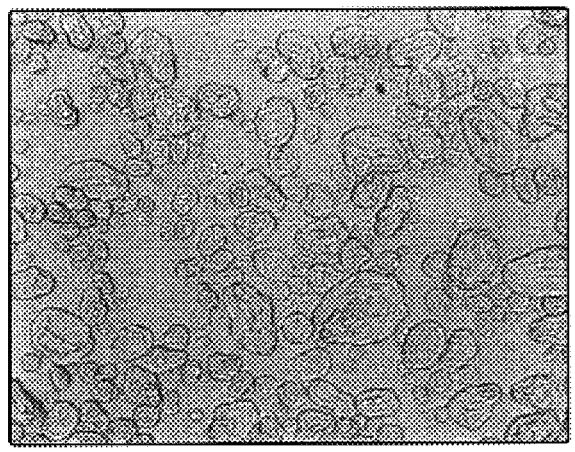
FIG. 5 Amylopectin PS with high crosslink level after 1 min. shear
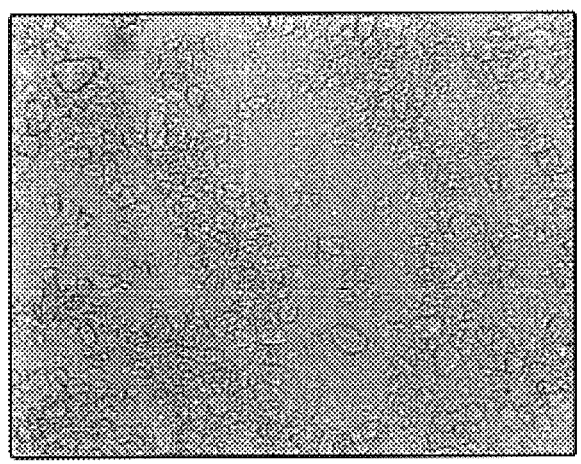
FIG. 6 Amylopectin PS with high crosslink level after 2 min. shear
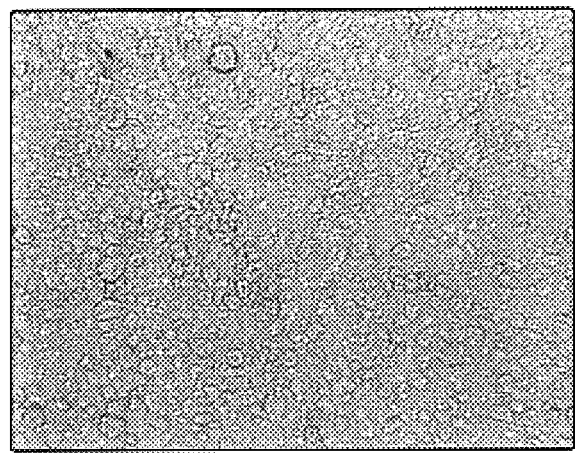

FIG. 7 Normal PS with low crosslink level before shear
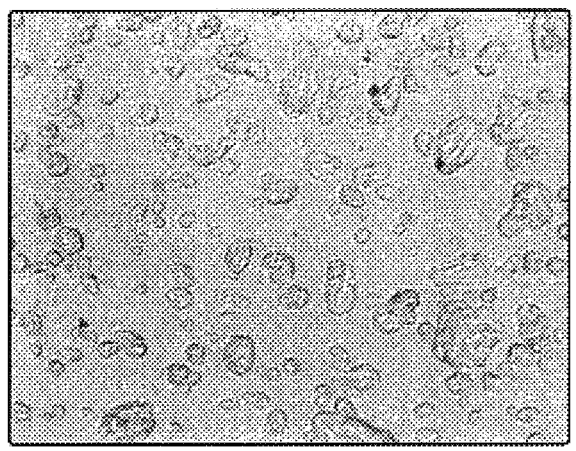
FIG. 8 Normal PS with low crosslink level after 1 min. shear
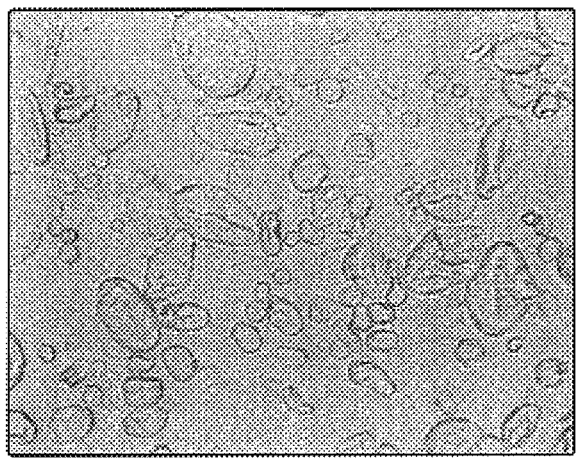
FIG. 9 Normal PS with low crosslink level after 2 min. shear
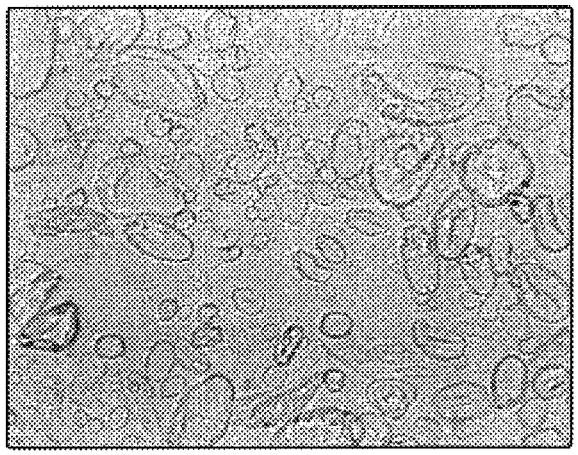

FIG. 10 Normal PS with high crosslink level before shear
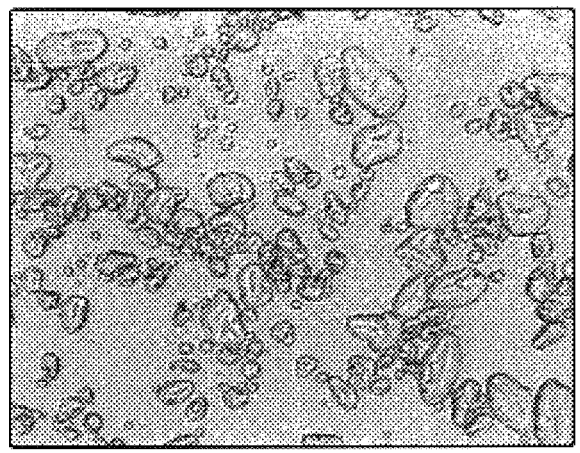
FIG. 11 Normal PS with high crosslink level after 2 min. shear
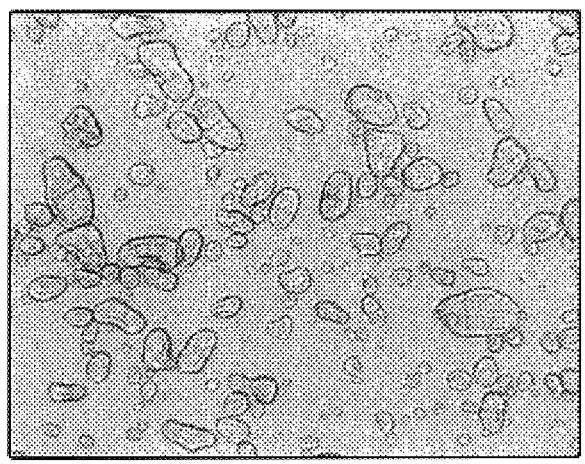
FIG. 12 Waxy maize starch with low crosslink level before shear
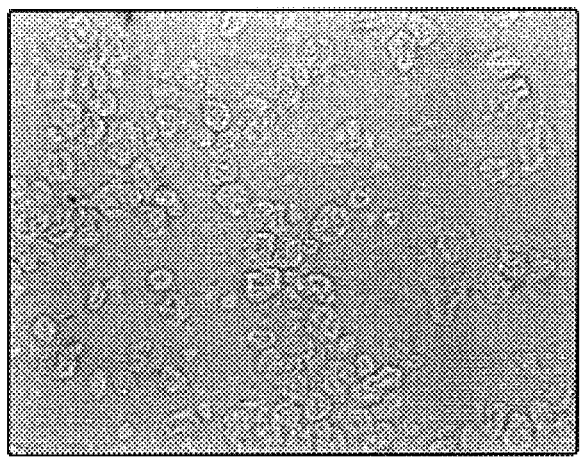

FIG. 13 Waxy maize starch with low crosslink level after 1 min. shear
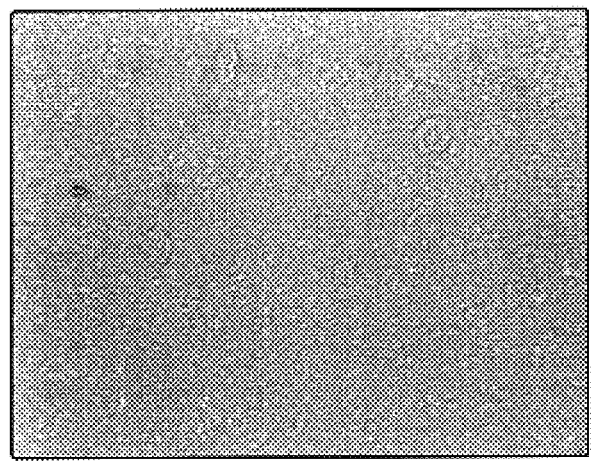
FIG. 14 Waxy maize starch with low crosslink level after 2 min. shear
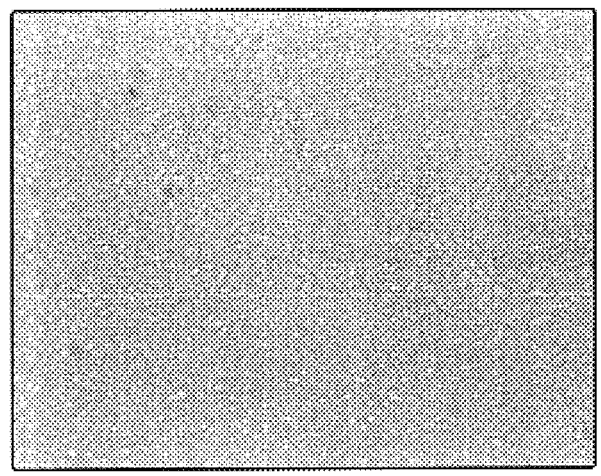

FIG. 15 Waxy maize starch with high crosslink level before shear
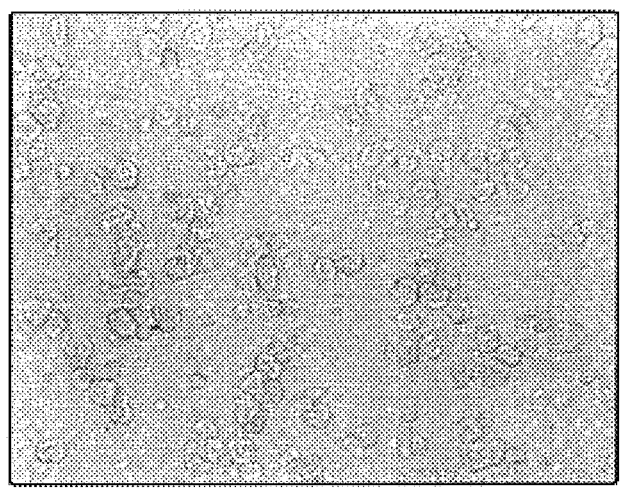
FIG. 16 Waxy maize starch with high crosslink level after 2 min. shear
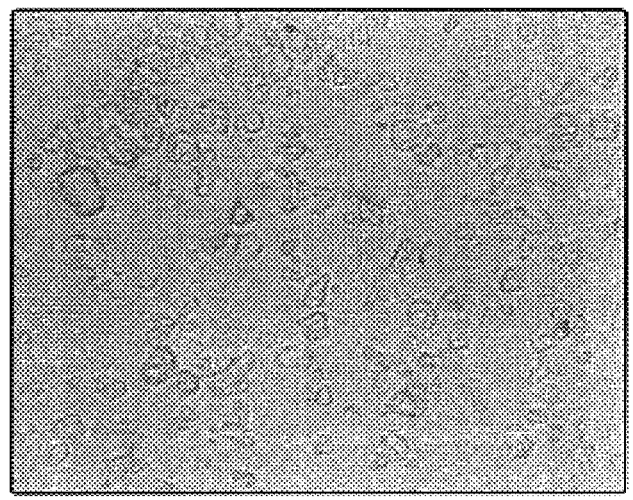

FIG. 17 Degraded potato starch with high crosslink level before shear
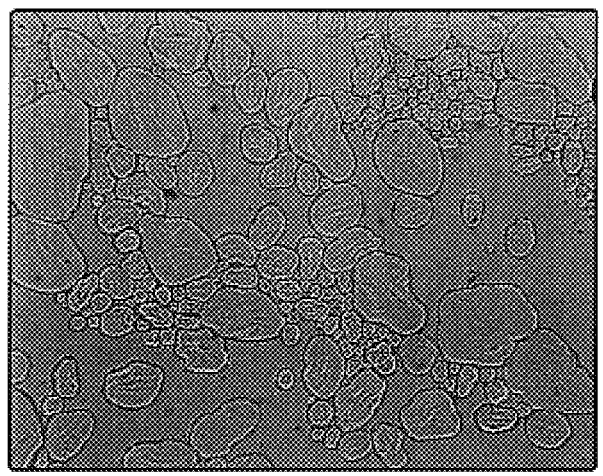
FIG. 18 Degraded potato starch with high crosslink level after 2 min. shear
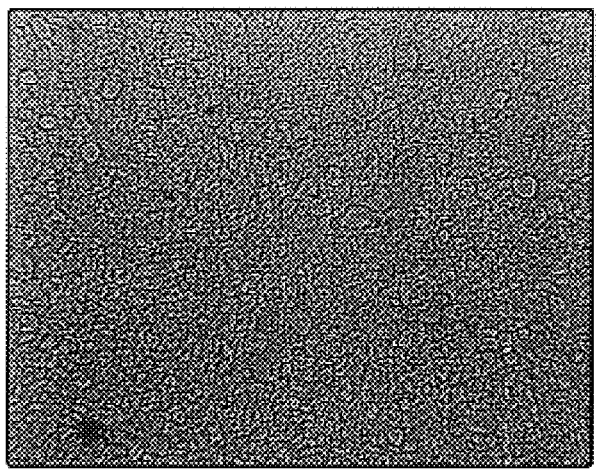

FOODSTUFF CONTAINING DISCRETE STARCH PARTICLES

This application is the U.S. National Phase of International Application Number PCT/NL00/00174 filed on Mar. 16, 2000.

BACKGROUND OF THE INVENTION

The invention relates to starch used in the food industry, more specifically to starch used in processed foodstuff that, at least in one processing step, is subject to heat and or shear treatment.

In nature starch is available in an abundance surpassed only by cellulose as a naturally occurring organic compound. It is found in all forms of green leafed plants, located in their roots, stems, seeds or fruits. Starch serves the plant as food for energy during dormancy and germination. It serves similar purposes for man and animal as well as lower forms of life. Man, however, has found uses for starch that extend far beyond its original design as a source of biological energy. Practically every industry in existence uses starch or its derivatives in one form or another.

In foods and pharmaceuticals starch is used to influence or control such characteristics as texture, aesthetics, moisture, consistency and shelf stability. It can be used to bind or to disintegrate; to expand or to densify; to clarify or to opacify; to attract moisture or to inhibit moisture; to produce short texture or long (stringy) texture, smooth texture or pulpy texture, to produce a (semi)solid gel or a (viscous) fluid, soft coatings or crisp coatings. It can be used to emulsify or to form oil resistant films. Starch can be used to aid processing, packaging, lubrication or moisture equilibration. Starch truly serves as a multifunctional ingredient in the food industry.

A The most common sources of food starch are maize, potato, wheat tapioca, and rice. Maize is cultivated in warmer climates, with half of the world's production grown in the USA, its biggest crop. China, the second largest producer in the world, grows about 10%. Approximately 70% of the world's potato supply is grown in the cool, moist, climate of Europe and Russia. Wheat, requiring a more temperate climate, is primarily grown in the USSR, North America, and Europe. Approximately 90% of world rice production comes from South and South East Asia, while tapioca is cultivated in the narrow tropical band at about the equator.

The building blocks of carbohydrates such as starch are α and β-D glucose which contain six carbon atoms and form pyranose rings. Through enzymatic condensation, one molecule of water is split out between two molecules of glucose to form a bond. This condensation occurs predominantly between carbons 1 and 4 but occasionally between 1 and 6.

Where the α 1,4 linkage develops, a linear chained homopolymer results which we refer to as amylose. The length of this chain will vary with plant source but in general the average length will run between 500 and 2,000 glucose units. Traditionally, amylose is considered as being only linear in configuration but recent investigations indicate the presence of limited branching in some amylose molecules.

The second type of polymer in starch develops when the enzymatic condensation between glucose units occurs at carbons 1 and 6. This occasional linkage, along with the predominant 1,4 bonding, results in a branching effect and the development of a molecule much more massive in size than amylose but with linear chain lengths of only 25–30 glucose units. This molecule is called amylopectin.

All starches are made up of one or both of these molecules but the ratio of one to the other will vary with the starch source. Maize has about 25–28% amylose with the remainder being amylopectin. High amylose maize can run as high as 80%. Waxy maize has none and tapioca has about 17% amylose. Potato has about 17–25% amylose with the remainder being amylopectin.

As the plant produces the starch molecules, it deposits them in successive layers around a central hilum to form a tightly packed granule. Wherever possible, adjacent amylose molecules and outer branches of amylopectin associate through hydrogen bonding in a parallel-wise fashion to give radially orientated, crystalline bundles known as "micelles". These micelles hold the granule together to permit swelling in (heated) water without the complete disruption and solubilisation of the individual starch molecules.

These highly orientated and crystalline micellular areas explain the ability of ungelatinised starch granules to rotate the plane of polarised light to produce characteristic interference crosses. This bi-refringent cross is one of the features used in identifying starch source. When the radial orientation of the crystalline micelle is disturbed, the bi-refringent cross disappears.

Gelatinisation temperatures are considered as ranges covering the temperatures at which loss of bi-refringence is first noticed and less than 10% remains. This temperature range is greatly influenced by the binding forces within the granule which vary with species. High amylose maize has much greater bonding force than the other maize varieties due to the high degree of linearity within the granule. On the other hand, ortho phosphate ester groups within the potato granule tend to weaken bonding and lower energy requirements to gelatinise.

When the starch granule is heated in water, the weaker hydrogen bonds in the amorphous areas are ruptured and the granule swells with progressive hydration. The more tightly bound micelles remain intact, holding the granule together. Bi-refringence is lost. As the granule continues to expand, more water is imbibed, clarity is improved, more space is occupied, movement is restricted and viscosity increased.

With the swelling of amylose-containing granules, some of the smaller amylose molecules are solubilised and leach out to re-associate into tight bundles which will precipitate if the starch concentration is low or will form a gel if the concentration is high. This is referred to as "set back" or retrogradation. The congealed paste will become cloudy and opaque with time and will eventually release water to shrink into a rubbery consistency.

Waxy maize has essentially no linear amylose molecules so its paste will remain flowable and clear. It will not gel or weep. Tapioca, having a small amount of amylose, gives a soft gel when pasted. Pastes from high amylose starch set to a very stiff gel.

To summarise the physical changes during gelatinisation: the granule swells and loses bi-refringence; clarity and viscosity increase; and smaller linear molecules dissolve and re-associate to form a gel.

In the unmodified form, starches have limited use in the food industry. Waxy maize starch is a good example. The unmodified granules hydrate with ease, swell rapidly, rupture, lose viscosity and produce weak bodied, very stringy and very cohesive pastes.

SUMMARY OF THE INVENTION

This invention relates to a method for providing a foodstuff with a short or smooth texture and/or shiny appearance after heat and/or shear treatment. The method comprises adding to the ingredients of a foodstuff a cross-linked starch, wherein said starch has a capacity to disintegrate into discrete particles after processing to provide said improved foodstuff.

BRIEF DESCRIPTION OF DRAWINGS

FIG. 1: Amylopectin PS with low cross-link level before shear.

FIG. 2: Amylopectin PS with low cross-link level after 1 min. shear.

FIG. 3: Amylopectin PS with low cross-link level after 2 min. shear.

FIG. 4: Amylopectin PS with high cross-link level before shear.

FIG. 5: Amylopectin PS with high cross-link level after 1 min. shear.

FIG. 6: Amylopectin PS with high cross-link level after 2 min. shear.

FIG. 7: Normal PS with low cross-link level before shear.

FIG. 8: Normal PS with low cross-link level after 1 min. shear.

FIG. 9: Normal PS with low cross-link level after 2 min. shear.

FIG. 10: Normal PS with high cross-link level before shear.

FIG. 11: Normal PS with high cross-link level after 2 min. shear.

FIG. 12: Waxy maize starch with low cross-link level before shear.

FIG. 13: Waxy maize starch with low cross-link level after 1 min. shear.

FIG. 14: Waxy maize starch with low cross-link level after 2 min. shear.

FIG. 15: Waxy maize starch with high cross-link level before shear.

FIG. 16: Waxy maize starch with high cross-link level after 2 min. shear.

FIG. 17: Degraded potato starch with high crosslink level before shear.

FIG. 18: Degraded potato starch with high crosslink level after 2 min. shear.

DETAILED DESCRIPTION OF THE INVENTION

Figure 19:
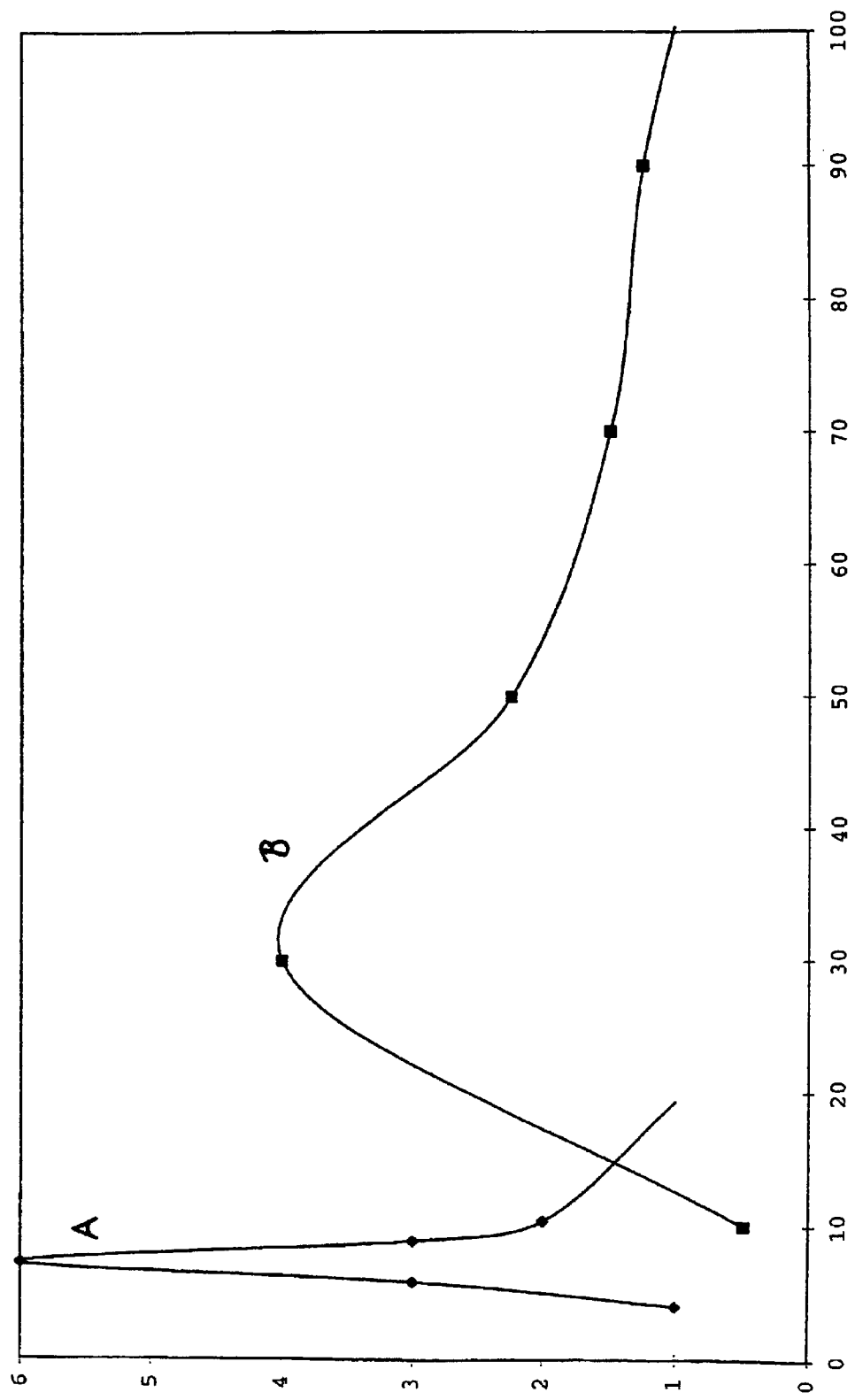
FIG. 19: The number average particle size distribution of starch in a retorted dessert. Line A is the distribution of an amylopectin PS derivative, line B the distribution of a normal PS derivative. The use of the amylopectin PS derivative results in a dessert with a smooth and shiny texture which is greatly appreciated by customers. Use of normal PS results in a coarse, bland or dull dessert which is generally not well liked. Particle size was measured using microscopic optometric analyses; i.e. two lines were drawn at random through a microscopic picture of a dessert sample, comparable to as shown for example in anyone of FIGS. 1 to 16, and each particle dissected by said line was assigned a size corresponding with the length of the line segment cutting through said particle.

In general, we modify starch to enhance or repress its inherent properties as appropriate for a specific application. To provide thickening, improve binding, increase stability, to improve mouthfeel and sheen, to gel, disperse or cloud.

In general, we cross-link to control texture and to provide heat, acid and shear tolerance. As a result, we have better control and improved flexibility in dealing with formulation, processing and product shelf-life. Cross-linking of starch in general is thought of as a means to "spot weld" the granule at random locations, reinforcing hydrogen bonding and inhibiting granule swell and disruption.

This cross-linking treatment strengthens the relatively tender waxy starches so that their cooked pastes are more viscous and heavy bodied and are less likely to break-down with extended cooking times, increased acid or severe agitation. In general cross-link level of a starch (and in particular of a waxy starch, see for example EP 0 796 868) is selected so that the product contains many fully swollen, intact granules after processing and packaging to achieve optimal viscosity and textural stability.

Another important starch modification is that of stabilisation. This modification prevents gelling and weeping and maintains textural appearance.

In selecting the proper starch to do the job one must consider the processing temperature, the length of time at that temperature and the forces of shear that the pasted starch will encounter. Food starches are for example used by the dairy industry in a wide variety of products to provide many desired properties including viscosity, texture, mouthfeel and improved stability. Starch selection is particularly important when considering dairy products due to the sensitive nature of the proteins present in milk. Many factors have to be considered before a choice of starch can be made; processing conditions, ingredients and storage requirements all influence the overall performance of a starch.

The higher the temperature, the greater the shear and the longer the time exposed to these forces, the more swollen the granule and the more fragile and susceptible it is to rupture. We can build in tolerances to shear, temperature and acid by supplementing hydrogen bonds in the granule by cross-linking.

In general it is desired to reach gelatinisation temperature during processing to ensure that the texture benefits of the starch are fully realised. Two exceptions to this are use of pregelatinised starch and use of starches in cook-up mixes, where the consumer will adequately cook the mix at home. Cooking time, temperature and amount of shear are all important parameters to consider when selecting a starch. Higher temperatures, higher shear rates and longer holding times all increase the degree of cook on a starch. For example, a modified starch can be cooked at 90° C. for 10 minutes (to reach optimal viscosity) but needs only 5–15 seconds at Ultra-High-Temperature (UHT) processing at 140° C.

Resistance to shear is considered particularly important in dairy and other products which are subjected to homogenisation. If the product contains a 'cook-up' type starch and is homogenised before cooking, then the starch passes through relatively undamaged. However, if the starch is gelatinised, it must be highly resistant to withstand the high shear encountered to avoid excessive granule rupturing resulting in starch comprising amorphous amylose and/or amylopectine conglomerations rendering the food with a slimy texture.

When foods are heat treated to pasteurisation temperature (75° C.), unless the proper starch is selected, the starch paste in the food system may be under-cooked, resulting in a cloudy, thin product. If foods are held at elevated temperatures for extended times, as may be the case in a kettle cook prior to filling, the starch may be over-cooked. This again may result in a product with ruptered starch granules with an undesirably amorphous, long and cohesive texture which makes the mouthfeel of the product slimy, which is in general not wanted by a customer who often prefers a short texture instead.

The impact of processing equipment on the starch granule is thus in general considered crucial. Shearing forces exerted by high speed mixing, milling, homogenisation or pumping can damage the starch granule and make the resulting foodstuff slimy. As mentioned earlier, by cross-linking the starch one in general builds in tolerance to shear as well as to temperature and acid. This is for example a requirement for salad dressing starches which are cooked at low pH, at high temperatures and are also subjected to colloid milling. Pudding starches subjected to flash cooling would be another example of a need for shear tolerance.

However, use of cross-linked starches in foodstuff subject to medium or high shear or temperature treatment has disadvantages as well, as it is in general not possible to provide a starch comprising foodstuff, such as a dessert, a sauce or soup, with a short, smooth or creamy texture and a shiny appearance. In general, use of cross-linked starches in foodstuff subject to shear and heat results in foodstuff having a blind or coarse texture or dull appearance. Empirically, however, it has been found that use of some types of cross-linked waxy cereal starches can result in foodstuff that, albeit somewhat thin because of lack of viscosity depending on the cross-link level used, is at least provided with a reasonably fair shortness, smoothness or shininess. However, often other, more expensive thickeners, such as gums or gelatine, need be used to improve the textural and visual properties of the product and provide resistance to processing conditions such as shear or temperature treatment.

The invention provides use of modified starches and methods to use these in foodstuffs (soups, (dairy) desserts, sauces, creams, dressings, fillings and such), that, when used in preparing foodstuff that is subject to heat and/or shear treatment, provide said foodstuff with the so desired smooth, short textures and shiny appearance, even after prolonged treatment where use of other starches would render the product slimy, coarse or dull.

The invention provides a method for preparing a foodstuff having a short or smooth texture and/or shiny appearance after medium to high heat and/or medium to high shear treatment comprising adding to the ingredients of said foodstuff a cross-linked starch or starch granule selected for its capacity to disintegrate into discrete particles after processing, in particular after heat and/or shear treatment. The invention described herein provides the insight that the textural sensations shortness and smoothness, and the visual sensation shininess, of food comprising starch, are among others related to size and cohesiveness of the starch fragments present in said food. Herein it is found that the presence of discrete starch particles smaller than general swollen starch granule size is beneficial to obtaining a food with those desired characteristics.

In short and oversimplified the insight provided by the invention is that use of a starch that, at least in the end product, after processing, has a large swollen starch granule leaves the food dull and blind, use of a starch having a ruptured granule after processing leaves the food with the slimy amorphous amylose or amylopectin conglomerates, but use of a starch which granules, after processing, disintegrate into cohesive or discrete starch particles smaller than general swollen starch granule size leaves the food short, smooth and/or shiny.

To generate a fat-like mouthfeel, WO89/12403 uses a cross-linked quinoa starch which particles are already very fine (diameter 1 to 5 microns), explicitly avoiding having to use more commonly available starches with much larger granules which are deemed not suitable. The present invention, however, preferably provides use of the more commercially attractive large granule type starches that are disintegrated from a dispersion into discrete fragments during or before preparing the food product, and does also not resort to making anew fragments from carbohydrate solutions, to provide the desired organoleptic characteristics. Similarly, very fine granule type starches (0. to 4 micron), such as selected from Colacasia esculenta, Saponaria vaccaria, Amaranthus retroflexus, Maranta arundinacea, Wheat B and buckwheat and again not commonly available are used in U.S. Pat. No. 5,370,894, whereas the present invention uses starches with much larger particles to begin with, having average diameters of more than 10, preferably more than 15, and even more preferably more than 20 micron, that are capable to disintegrate from a dispersion into discrete fragments said fragments providing the desired organoleptic characteristics.

WO98/31240, preferably starting from rice starch which has granule diameters of in general between 2 and 10 micron, mixes raw (non-cross-linked) starches with protein solutions to obtain a texturing agent having distinct size patterns, being mixtures of smaller (e.g. 0.1 to 20 microns) and larger (e.g. 100 to 400) particles.

In a preferred embodiment, the invention provides a method for preparing a foodstuff having a short or smooth texture and/or shiny appearance after medium to high heat and/or medium to high shear treatment comprising adding to said foodstuff a starch comprising cross-linked starch granules capable of disintegrating into discrete particles after heat and/or shear treatment further comprising subjecting said foodstuff to heat and/or shear treatment. As for example can be seen when comparing tables 3 and 4, heat and shear treatment even brings out the desired characteristics when using starch according to the invention.

The invention furthermore provides a method according to the invention wherein said cross-linked starch granules are non-cereal starch granules. For foodstuff, it is in general desirable that a starch be bland or neutral in flavour when used in desserts, sauces, soup-mixes, pie fillings, dressings and the like. The starches generally having the most neutral taste are non-cereal, such as tuber- or root-type, starches, such as potato or tapioca, when compared to starches such as corn, wheat, rice, sorghum, waxy maize and waxy sorghum, which, when incorporated into food, give some undesirable flavour (peculiar to the starch) to the food. These off-flavours have been described by some individuals as 'woody', 'corny', 'starchey', 'bitey' or 'chalkey', and these flavours often come out most poignant after heat treatment. It is now very well possible to avoid these off-flavours in foodstuff subject to heat and/or shear treatment by using a non-cereal starch according to the invention in the preparation of these foods.

In a preferred embodiment of a method according to the invention said starch is potato starch, preferably a degraded potato starch, preferably derived from a normal potato, preferably having normal amylose content. Degradation can be achieved by treatment with oxidising agents, or enzymes, or preferably, by treatment with acid, such as by treatment with a mineral acid, such as sulphuric acid or by treatment with sodium hypochlorite. Degrees of degradation are preferably chosen so that a certain measure of disintegration, of course depending on the preferences of the public for which the foodstuff is mainly intended, can be reached after processing, to arrive at the so desired discrete particles providing the desired texture or organoleptic properties, to retain or obtain an essentially short, smooth texture, preferably with shine.

Acid treatment is for example already practised to improve taste (U.S. Pat. No. 4,368,212), but therein not to improve organoleptic characteristics such as texture, mouthfeel and shine.

Also preferred is a method according to the invention wherein said starch granules are derived from a starch of the so-called waxy type, herein defined as having a amylopectin:amylose ratio of at least 90:10, preferably at least 95:5, more preferably at least 99:1. With higher amylopectin content of the granule it is easier to obtain discrete starch particles, especially using low cross-link levels, without degradation. Even more preferred is a starch derived from a waxy-type potato, wherein it is possible to vary most with cross-link ratios, especially when compared with waxy corn. Degrees of cross-linking are preferably chosen so that a certain measure of disintegration can be reached after processing, to arrive at the so desired discrete particles providing the desired texture or organoleptic properties, to retain or obtain a short, smooth texture, preferably with shine.

The invention also provides a cross-linked starch granule capable of disintegrating into discrete particles after medium to high heat and/or medium to high shear treatment. Said discrete particles are demonstrated in several of the microscopic images given herein, and foodstuff containing such discrete particles can easily be distinguished from other foodstuff by measuring particle size distribution, as exemplified in FIG. 19. In a preferred embodiment, the invention provides a non-cereal starch granule capable of disintegrating into discrete particles after medium to high heat and/or medium to high shear treatment, preferably derived from an acid degraded potato starch or from a potato starch having a amylopectin:amylose ratio of at least 90:10, preferably at least 95:5, more preferably at least 99:1, for example derived from a genetically modified potato plant mutant or from an amylose-free potato plant mutant.

In a preferred embodiment, the invention provides a starch granule according to the invention, said granule having been subjected to cross-linking. Cross-linking starch in itself is a method known in the art and various agents are known. Examples are: epichlorohydrin, sodium trimetaphosphate, phosphorous oxychloride (POCl3), adipic anhydride, or other reagents with two or more halogen, halohydrin or epoxide groups or combinations which all can be used as cross-linking agents. Preferred are distarch phosphates and distarch adipates. A cross-linked or cross-bonded starch may for example be cross-bonded with 0.003 to 0.024% of adipic anhydride, preferably with 0.01 to 0.03%. Prior to cross-bonding with adipic anhydride the starch may be treated with hydrogen peroxide and/or peracetic acid. Preferably with a quantity which corresponds with 0.001% to 0.045% of active oxygen, most preferably with 0.005 to 0.045%. A distarch phosphate may for example be crossbonded with sodium trimetaphosphate up to such a degree that the residual phosphate is no more than 0.14% for a potato starch or 0.04% for other starches. Preferably the starch is cross-bonded with 0.01% to 0.25%, most preferably with 0.025 to 0.15% of sodium trimetaphosphate, under conditions known to the artisan. Degrees of cross-linking are preferably chosen so that a certain measure of disintegration can be reached after processing. For example, for sodium trimetaphosphate (STMP) cross-linking, 0–5000, preferably 250–2500 mg STMP/kg starch is used, for POCl$_3$, 0–400, or 0–200, preferably 40–150 or 75–100 $\mu$L POCl3/kg starch is used. Of course it is always possible for the artisan to find conditions, possibly in which the reactants react with a low yield, outside of the preferred conditions resulting in a starch with desired properties. A distarch phosphate may as well be cross-bonded with phosphorous oxychloride up to such a degree that the residual phosphate is not more than 0.14% for a potato starch or 0.4% for other starches. Preferably the starch is cross-bonded with 0.00010% to 0.01% of phosphorous oxychloride, under conditions known to the artisan. Of course it is always possible for the artisan to find conditions in which the reactants react with a very low yield, outside of the preferred conditions resulting in a starch with the desired properties.

Also preferred is a starch granule according to the invention having been subjected to stabilisation. Stabilisation in general is done by a method known in the art, such as by treatment with acetic anhydride or vinyl acetate, by hydroxyalkylation or comparable treatment. Stabilisation by hydroxyalkylation of starch is for example obtained with reagents containing a halohydrin, or an epoxide group as reactive site. The addition of hydroxypropyl groups is generally performed in aqueous suspensions of starch using propylene oxide, under alkaline conditions. Cross-bonding and/or stabilising reagents are reacted with starch under alkaline conditions. Suitable alkali materials are: sodium hydroxide, potassium hydroxide, ammonium hydroxide, magnesium hydroxide, sodium carbonate and trisodium phosphate. Preferred are the alkali metal hydroxides and carbonates, most preferred are sodium hydroxide and sodium carbonate. Sometimes salts are added as to prevent swelling under alkaline reaction conditions. Preferred are sodium chloride and sodium sulphate. Stabilisation by acetylation is performed using acetic anhydride or vinyl acetate. Other stabilisation reagents are for example succinic anhydride, 1-octenyl succinic anhydride, sodium tripolyphosphate, potassium orthophosphate, sodium orthophosphate or orthophosphoric acid.

The invention also provides foodstuff having been subjected to heat and/or shear treatment comprising discrete particles derived from a granule according to the invention. Such foodstuff is provided having an improved texture and/or appearance, especially being short, smooth or shiny. The invention also provides use of a starch granule and/or method according to the invention in the preparation of foodstuff subject to heat and or shear treatment to improve texture and/or taste of said foodstuff. The invention is further explained in the detailed description herein without limiting the invention.

DETAILED DESCRIPTION

Preparation of Hydroxypropylated Crosslinked Starches

A 39% starch slurry was prepared from different raw materials. To this slurry was added sodium sulfate (100 g/kg starch) and sodium hydroxide (7.5 g/kg starch) as a 4.4% solution. The temperature was raised to 35° C. and sodium trimetaphosphate (NaTMF) was added. For low crosslinked starches 625 mg NaTMF/kg starch was used, low being defined as varying between 325 to 1000 mg NaTMF/kg starch or functionally equivalent with other cross-linking agents, the high crosslinked starches were prepared with 2500 mg NaTMF/kg starch, high being defined as varying between 1000 to 3500 mg NaTMF/kg starch or functionally equivalent with other cross-linking agents. Next, propylene oxide (DSmax=0.33) was introduced and the reaction was allowed to proceed for 20–24 hours. The slurry was neutralized with sulfuric acid to a pH of 5–6 and washed and dried by using conventional means known to the art. The raw materials used were amylopectin potato starch, normal potato starch and waxy maize starch and degraded potato starch. For the degradation of potato starch, different methods were used such as acid degradation, oxidative degradation or enzymatic degradation, employing conditions well known in the art. For example, a 39% starch slurry was treated with 10 N $H_2SO_4$ (in a quantity corresponding to 0.5–20 mol %, or wih sodium hypochlorite with a quantity corresponding to 0.1–5% $Cl_2$ for 6–24 hours at 35–55, preferably 45° C. After washing and drying the product was used as a raw material for the hydroxypropylation and cross-linking. Preferably higher cross-link levels then 625 mg NaTMF were used due to the lower molecular weight of the degraded starches.

Viscosity and Disintegration Measurements

A slurry containing 5% hydroxypropylated and crosslinked starch on a dry weight basis was prepared and heated in a Brabender viscograph following a temperature profile. First the suspension was heated to 45° C. rapidly, then the mixture was heated to 90° C. at a rate of 1.5° C./mine and kept at this temperature for 20 min. Finally the solution was cooled to 25° C. at a rate of 1.5° C./min. From the solution thus obtained the viscosity was measured on a Brookfield apparatus and a microscopic picture was taken of the solution which was diluted in some cases. Next the solution was exposed to high shear conditions (Ultraturrax, 10000 rpm) for one and two minutes and the same measurements were performed. Apart from these measurements the texture of the solutions was investigated.

Table 1 shows the results of the viscosity measurements and Table 2 the results of the microscopic pictures of the solutions (see FIGS. 1 to 16 for the photographs).

TABLE 1

Viscosity measurements

| | | Brookfield (mPas) | | |
|---|---|---|---|---|
| starch | crosslink level | for shear | after 1 min. shear | after 2 min. shear |
| amylopectin | low | 37350 | 28200 | 23750 |
| amylopectin | high | 104 | 1980 | 1330 |
| normal PS | low | 1330 | 12066 | 10440 |
| normal PS* | high | — | — | — |
| waxy maize | low | 2000 | 3490 | 3110 |
| waxy maize | high | 18 | — | 64 |
| acid degr. PS** | low | 11760 | — | 980 |
| acid degr. PS** | high*** | 14000 | — | 6050 |

*the high crosslinked normal potato starch was to thin for a good measurement.
**6% concentration
***high is 1250 mg NaTMF/kilo starch (20% moisture)

TABLE 2

Microscopic pictures

| | | | disintegration level of particles | |
|---|---|---|---|---|
| starch | crosslink level | before shear | after 1 min. shear | after 2 min. shear |
| amylopectin PS | low | big, swollen | mostly disintegrated, small | completely disintegrated, very small |
| amylopectin PS | high | medium size, swollen | partly disintegrated | mostly disintegrated, small |
| normal PS | low | small, swollen | big, swollen | very big, swollen |
| normal PS | high | small, swollen | — | medium size, swollen |

TABLE 2-continued

Microscopic pictures

| | | | disintegration level of particles | |
|---|---|---|---|---|
| starch | crosslink level | before shear | after 1 min. shear | after 2 min. shear |
| waxy maize | low | medium size, swollen | mostly disintegrated, small | completely disintegrated, very small |
| waxy maize | high | small, swollen | — | small, swollen |
| acid degr, PS | low | large swollen | — | very small disintegrated |
| acid degr. PS | high | large swollen | — | small, disintegrated |

Disintegration only takes place with the waxy and with the degraded derivatives. Both high and low crosslinked amylopectin potato starch show disintegration whereas only the lower crosslinked waxy maize derivative disintegrated under the applied shear. The amylopectin and the degraded potato starch derivative with the lowest crosslink level after shear consisted of smaller particles then the derivatives with the higher crosslink level.

All potato starch derivatives before shear essentially have a pulpy, coarse or dull texture. After shear the amylopectin and the degraded derivatives have changed to a smooth, shiny and short paste. The lower crosslinked amylopectin potato derivative is more cohesive than the higher crosslinked derivative which is similar to the waxy maize derivative after shear. The degraded potato starch derivative gave a low viscous shiny dispersion while the higher crosslinked derivative gave a viscous paste comparable to the higher crosslinked amylopectin potato starch derivative. The normal potato starch products stay pulpy and dull after shear. The waxy maize derivatives become more shiny, smooth and creamy after shear but the difference between the paste before and after shear is not so explicit as for the amylopectin potato starch derivatives. Of all the derivatives only the lowest crosslinked amylopectin potato starch gave a clear paste which makes it very suitable for application in a fruitfilling. The results are summarised in the following two tables.

TABLE 3

Texture of the 5% solutions before shear

| starch | crosslink level | appearance |
|---|---|---|
| amylopectin | low | viscous, pulpy, dull |
| amylopectin | high | thin, coarse, dull |
| normal PS | low | medium viscous, pulpy, dull |
| normal PS | high | very thin, coarse, dull |
| waxy maize | low | medium viscous, reasonable shiny, blind |
| waxy maize | high | very thin, reasonable shiny, blind |
| acid degr. PS* | low | viscous, pulpy, dull |
| acid degr. PS* | high | viscous, pulpy, dull |

*6% solutions

TABLE 4

Texture of the 5% solutions after 2 min. shear

| starch | crosslink level | appearance |
|---|---|---|
| amylopectin | low | highly viscous, short, shiny, smooth, cohesive, clear |
| amylopectin | high | viscous, shiny, smooth |
| normal PS | low | viscous, pulpy, dull |
| normal PS | high | thin, coarse |
| waxy maize | low | medium viscous, shiny, smooth, short, creamy, cohesive, blind |
| waxy maize | high | thin, shiny, blind |
| acid degr. PS* | low | thin, shiny, clear |
| acid degr. PS* | high | viscous, shiny, smooth, reasonably clear |

*6% solutions

When hydroxypropylated crosslinked amylopectin or degraded potato starch is used in an application were high shear is involved in the procedure a smooth and shiny product is obtained. Amylopectin potato starch products with a low crosslink level are very clear and have a cohesive structure. This cohesiveness is also found in similar waxy maize derivatives but the latter lack the clearness. Amylopectin potato starch products with a higher crosslink level are not clear and less cohesive but still smooth and shiny. Degraded potato starch derivatives with a high crosslink level behave similar while the lower crosslink level gives a low viscous dispersion consisting of small particles. Normal potato starch derivatives give under the high shear conditions pastes with pulpy and dull textures. On a granule level it was observed that the big swollen particles of amylopectin and degraded potato starch paste disintegrate under influence of high shear which is not observed with a similar normal potato starch derivative. This phenomenon accounts for the texture differences. Maize derivatives also disintegrate but this was only observed on a low crosslink level.

A hydroxypropylated and crosslinked derivative of amylopectin or degraded potato starch derivatives give smooth, short and shiny textures when they are cooked and a certain amount of shear is applied (jetcooking). A similar derivative of normal potato starch does not have these features. When this derivative is jetcooked the solution gave a dull and pulpy texture. In some applications such as dressings, fruit-fillings and puddings the smooth and shiny texture is desired while in other applications such as tomato sauce the pulpy texture is preferred. The observed difference is caused by the ease of granular disintegration of the amylopectin and degraded derivative compared to the normal potato starch derivative. To visualize this effect some hydroxypropylated amylopectin potato starch, acid degraded potato starch, normal potato starch and waxy maize derivatives with two degrees of crosslinking were prepared and investigated after heating under low-shear conditions and after high-shear conditions. Microscopic pictures were taken from the solutions to visualize the difference in particle size.

Food Examples.
Spoonable Dressings
Equipment Fryma Colloidal Mill
Dressing A (pH 4,3–4,4)
Ingredients

|  | % | g |
|---|---|---|
| Starch derivative | 6.0 | 180 |
| Paselli MD10 | 5.0 | 150 |
| Powdered sugar | 2.0 | 60 |
| Salt | 1.5 | 45 |
| Sodium benzoate | 0.1 | 3 |
| Potassium sorbate | 0.1 | 3 |
| Vinegar (5%) | 8.0 | 240 |
| lemon juice | 0.8 | 24 |
| Mustard | 1.0 | 30 |
| Egg powder (whole) | 2.4 | 72 |
| Oil | 2.0 | 60 |
| Tap water | 71.1 | 2133 |
| Total | 100.0 | 3000 |

Dressing B (pH 3,6–3,70)

|  | % | g |
|---|---|---|
| Starch derivative | 6.0 | 180 |
| Paselli MD10 | 5.0 | 150 |
| Powdered sugar | 5.0 | 150 |
| Salt | 1.5 | 45 |
| Sodium benzoate | 0.1 | 3 |
| Potassium sorbate | 0.1 | 3 |
| Vinegar (5%) | 10.0 | 300 |
| Citric ad | 0.4 | 12 |
| Mustard | 1.0 | 30 |
| Egg powder (whole) | 2.4 | 72 |
| Oil | 2.0 | 60 |
| Tap water | 66.5 | 1955 |
| Total | 100.0 | 3000 |

Preparation Procedure
  Mix in a plastic bag the dry ingredients (except egg powder)
  Mix in a bowl the vinegar, the lemon juice and 1833 of the water
  Mix the dry ingredients in the liquid and heat while stirring on a steam bath for 15 min.
  Cool to 20° C.
  Mix the egg powder with the remaining and add the mustard
  Create a vacuum in the Fryma of 500 mbar
  Turn on the scrapers and fill the Fryma with the starch mixture
  Add the egg/mustard mixture
  After 30 sec. add the oil (also in 30 sec.)
  Mix in the Fryma for another 30 sec.
  From this the dressing is obtained.
Tomato Sauce
Ingredients

|  | % |
|---|---|
| Tomato puree | 15.0 |
| Starch derivative | 4.0 |
| Salt | 2.5 |
| Powdered sugar | 12.5 |
| Vinegar (5%) | 12.5 |
| Sodium benzoate | 0.1 |
| Potassium sorbate | 0.1 |
| Tap water | 53.3 |
| Total | 100.0 |

Preparation Procedure

Mix the dry ingredients

Mix, water and the tomato puree in a sauce pan

Add the dry ingredient mix to the liquid

Heat while stirring to 90–95° C.

Heat for 15 min at this temperature

Cool to 20° C.

Tomato Soup

Ingredients

|  | g | % |
|---|---|---|
| Tap water | 345.0 | 86.25 |
| Tomato puree | 28.0 | 7.00 |
| Starch derivative | 16.0 | 4.00 |
| Sugar | 4.0 | 1.00 |
| Salt | 3.0 | 0.75 |
| Sun flower oil | 1.6 | 0.40 |
| Tomato taste 2M-18322 | 1.2 | 0.30 |
| Bouillon taste 34099 | 0.8 | 0.20 |
| MSG | 0.4 | 0.10 |
| Total | 400.0 | 100.00 |

Preparation Procedure

The ingredients, except the starch derivative, are mixed in beaker

The mixture is heated to 45–50° C. while stirring

The solution is cooled to 25–30° C.

16, 0 g of starch derivative is weighed into a can

The can is filled with the solution to a total of 400 g

The can is closed and shaken

The is sterilized for 55 min at 120° C.

UHT Pudding (Dutch Style)

Ingredients

|  |  | % |
|---|---|---|
| Skimmed milk powder | 3150 g | 9.3 |
| Sugar | 2310 g | 6.8 |
| Starch derivative | 1380 g | 4.1 |
| Colour/taste | 39 g | 0.12 |
| Salt | 15 g | 0.04 |
| Satiagel HMR | 7.5 g | 0.02 |
| Tap water | 27 L | 79.6 |

Preparation Procedure

In a vessel 27 L water is given. To this the milk powder is added and suspended by stirring. The rest of the ingredients is mixed and after 5 min added to the milk. The suspension is pumped to a buffer tank and heated through a plate-exchanger to 80° C. and transferred to a jet cooker and cooked at 140° C. for a few seconds. The pudding is cooled to 40° C. and filled into cups that are is subsequently sealed.

Gel Strength Measurement

The gel strength of the dressing is measured on a Stevens LPRA apparatus using a TA 11 plunger with a speed of 2 mm/s and a penetration depth of 40 mm.

A spoonable dressing was prepared according to procedure A. The gel strength of the products was determined. The results are summarised in table 5. Also the products were evaluated for their sensoric properties.

TABLE 5

Stevens gel strength (in mPas) of a spoonable dressing prepared according to procedure A

| Product | starch | gel strength after 1 day | gel strength after 1 week | gel strength after 1 month | gel strength after 6 months |
|---|---|---|---|---|---|
| A | APS | 81 | 82 | 98 | 150 |
| B | WMS | 71 | 76 | 92 | 159 |
| C** | PS | 25 | 25 | — | — |

**Product low viscous, phase separation after 1 week

The dressings of based on the products A and B were both shiny directly after preparation. After 6 months, however, they were slightly gelled and somewhat dull. This could be reversed with stirring by hand. The dressing based on product C was low viscous and had a pulpy, dull texture. After two weeks phase separation in the dressing of product C was observed.

In the before mentioned dressing the pH of the system is about 4,3. The pH can have large influence on the properties of products depending on the modification and the type of starch. In table 6 the results are summarised for a more acidic type of dressing.

TABLE 6

Stevens gel strength (in mPas) of dressings prepared according to procedure B

| Product | starch | gel strength after 1 week | gel strength after 1 month | gel strength after 2 months | gel strength after 6 months |
|---|---|---|---|---|---|
| D | APS | 150 | 170 | 180 | 250 |
| E | WMS | 140 | 170 | 190 | 250 |

The dressings were both shiny directly after preparation. After 6 months, however, they were slightly gelled and somewhat dull. This could be reversed with stirring by hand.

As a third possibility amylopectin potato starches can be applied in tomato sauce. The results have been summarised in table 7.

TABLE 7

Gel strength and viscosity of tomato sauce

| Product | starch | Modification | Stevens | Brookfield HAT | Brookfield RVT |
|---|---|---|---|---|---|
| F | WMS | Adip-ac | 60 | 11600 | 17000 |
| G | APS | NaTMF-ac | 75 | 14200 | 16000 |
| H | APS | Adip-ac | 72 | 13400 | 14800 |

The tomato sauces based on all product were shiny and short. Potato starch derivatives give pulpy textures which are sometimes prefered.

TABLE 8

Viscosity of tomato soups

| Product | starch | Modification | Viscosity in mPas after 1 month | 3 months | 6 months |
|---|---|---|---|---|---|
| F | WMS | Adip-ac | 8080 | 5180 | 6300 |
| E | WMS | $POCl_3$-HP | 9340 | 7860 | 8280 |

TABLE 8-continued

Viscosity of tomato soups

| Product | starch | Modification | Viscosity in mPas after... | | |
|---------|--------|--------------|---------|----------|----------|
| | | | 1 month | 3 months | 6 months |
| I | APS | Adip-ac | 8540 | 7140 | 5900 |
| J | APS | NaTMF-HP | 9440 | 9480 | 10400 |

The conclusion from the experiments is that the viscosity of the soups based on APS and WMS is comparable. The texture of all soups is short and shiny.

The conclusion from the food examples is that due to graular disintegration amylopectin potato starch derivatives give short, shiny textures comparable to non disintegrated waxy cereal derivatives. (Waxy) cereal starches have the draw back that they have a less desirable taste and that they sometimes cannot be applied in some food systems due to religious restrictions.

TABLE 9

Processing equipment and conditions affecting starch performance

| Equipment | Conditions |
|-----------|------------|
| Steam jacketed kettle | Low shear, long cook and cooling times |
| Swept surface cooker and cooler | Medium shear, fast cooking and cooling times |
| Steam infusion cooker | Medium shear, high temperature, short cooking time |
| Pumping equipment | Medium to high shear |
| Steam injection (jet) cooker | Medium/high shear, fast cook, high temperature |
| Swept surface cooker with flash cooling | High shear, fast cook and cooling times |
| Plate heat exchange cooker and cooler | High shear, short cooking and cooling times |
| Colloid mill | Very high shear |

Note: Steam jacketed kettles with sweeping mixers are normally considered as low in shear; steam injection and plate cookers as medium in shear; plate coolers, flash coolers and milling equipment as high, and homogenisers as extremely high in shear. This is a general statement, damage of course also depends on the length of treatment and on the temperatures used. It is for example possible that a steam jacketed kettle may do as much damage to the starch granule over an extended time as an homogeniser in a short time.

What is claimed is:

1. A method for providing an improved foodstuff with a short or smooth texture and/or shiny appearance after heat and/or shear treatment comprising:

adding to the ingredients of a foodstuff a non-cereal starch cross-linked starch, wherein said starch has a capacity to disintegrate into discrete particles after processing, and wherein said starch is cross-linked with at least 0.003% of adipic anhydride, with at least 0.01% of sodium trimetaphosphate, or with at least 0.00010% of phosphorous oxychloride, and processing said foodstuff containing said starch, wherein processing comprises heat and/or shear treatment, wherein said improved foodstuff is provided.

2. A method according to claim 1, wherein said starch is degraded.

3. A method according to claim 1 wherein said starch is cross-linked with 0.003 % to 0.0024 % of adipic anhydride, with 0.01 % to 0.25 % of sodium trimetaphosphate, or with 0.00010 % of phosphorous oxychloride.

4. A composition comprising a non-cereal cross-linked starch, wherein said starch provides a foodstuff with a short or smooth texture and/or shiny appearance after heat and/or shear treatment, wherein said starch has an amylopectin:amylose ratio of at least 90:10, 95:5, or 99:1, and wherein said starch is cross-linked with at least 0.003% of adipic anhydride, with at least 0.01% of sodium trimetaphosphate, or with at least 0.00010% of phosphorous oxychloride, and wherein said starch has a capacity to disintegrate into discrete particles after processing.

5. A composition according to claim 4, wherein said starch is derived from a genetically modified potato plant mutant or from an amylose-free potato plant mutant.

6. A composition according to claim 5, wherein said starch has been subjected to stabilisation.

7. A composition according to claim 4 wherein said starch is cross-linked with 0.003% to 0.024% of adipic anhydride, with 0.01% to 0.25% of sodium trimetaphosphate, or with 0.00010% to 0.01% of phosphorous oxychloride.

8. A foodstuff having a short or smooth texture and/or shiny appearance after heat and/or shear treatment comprising a cross-linked starch which has a capacity to disintegrate into discrete particles after processing wherein said starch has an amylopectin:amylose ratio of at least 90:10, 95:5, or 99:1, and wherein said starch is cross-linked with at least 0.003% of adipic anhydride, with at least 0.01% of sodium trimetaphosphate, or with at least 0.00010% of phosphorous oxychloride.

9. A foodstuff according to claim 8 wherein the discrete particles are derived from a starch granule.

10. A foodstuff according to claim 8 wherein said starch is cross-linked with 0.003% to 0.024% of adipic anhydride, with 0.01% to 0.25% of sodium trimetaphosphate, or with 0.00010% to 0.01% of phosphorous oxychloride.

11. A foodstuff having a short or smooth texture and/or shiny appearance after heat and/or shear treatment produced by a method comprising:

adding to a foodstuff a cross-linked starch, wherein said starch has a capacity to disintegrate into discrete particles after heat and/or shear treatment, wherein said starch has an amylopectin:amylose ratio of at least 90:10, 95:5, or 99:1, and wherein said starch is cross-linked with at least 0.003% of adipic anhydride, with at least 0.01% of sodium trimetaphosphate, or with at least 0.00010% of phosphorus oxychloride, and subjecting the foodstuff to heat and/or shear treatment.

12. A method according to claim 11 wherein said starch is cross-linked with 0.003% to 0.024% of adipic anhydride, with 0.01% to 0.25% of sodium trimetaphosphate, or with 0.00010% to 0.01% of phosphorous oxychloride.

* * * * *

UNITED STATES PATENT AND TRADEMARK OFFICE
CERTIFICATE OF CORRECTION

PATENT NO. : 6,899,913 B1
DATED : May 31, 2005
INVENTOR(S) : Buwalda et al.

It is certified that error appears in the above-identified patent and that said Letters Patent is hereby corrected as shown below:

Column 1,
Line 35, now reads "A The most common" should read -- The most common --.

Column 15,
Lines 52-53, now reads "ingredients of a foodstuff a non-cereal starch cross-linked starch" should read -- ingredients of a foodstuff a non-cereal cross-linked starch --.
Line 54, now reads "processing," should read -- processing, wherein said starch has an amylopectin:amylose ratio of at least 90:10, or 99:1, --.

Column 16,
Line 4, now reads "with 0.003% to 0.0024%" should read -- with 0.003% to 0.024% --.
Line 6, now reads "0.00010% of phosphorous" should read -- 0.00010% to 0.01% of phosphorous --.

Signed and Sealed this

Twenty-second Day of November, 2005

JON W. DUDAS
*Director of the United States Patent and Trademark Office*